United States Patent
Barbier et al.

(10) Patent No.: US 9,650,268 B2
(45) Date of Patent: May 16, 2017

(54) COMPACT WATER TREATMENT DEVICE

(71) Applicant: VEOLIA WATER SOLUTIONS & TECHNOLOGIES SUPPORT, Saint Maurice (FR)

(72) Inventors: Eric Barbier, Montesson (FR); Arnaud Genin, Maisons Laffitte (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 145 days.

(21) Appl. No.: 14/390,450

(22) PCT Filed: Mar. 28, 2013

(86) PCT No.: PCT/FR2013/050689
§ 371 (c)(1),
(2) Date: Oct. 3, 2014

(87) PCT Pub. No.: WO2013/150222
PCT Pub. Date: Oct. 10, 2013

(65) Prior Publication Data
US 2015/0048030 A1     Feb. 19, 2015

(30) Foreign Application Priority Data
Apr. 4, 2012   (FR) ...................... 12 53117

(51) Int. Cl.
*C02F 1/52* (2006.01)
*B01D 21/00* (2006.01)
(Continued)

(52) U.S. Cl.
CPC ........ *C02F 1/5281* (2013.01); *B01D 21/0039* (2013.01); *B01D 21/0042* (2013.01);
(Continued)

(58) Field of Classification Search
None
See application file for complete search history.

(56) References Cited

U.S. PATENT DOCUMENTS 3,903,000 A  *  9/1975  Miura ................ B01D 21/0006
                                                      209/437
4,142,970 A     3/1979  von Hagel et al.
(Continued)

FOREIGN PATENT DOCUMENTS

EP          0361225 A1    4/1990
EP          0423964 A1    4/1991
(Continued)

*Primary Examiner* — Chester Barry
(74) *Attorney, Agent, or Firm* — Coats and Bennett PLLC

(57) ABSTRACT

The invention relates to a water treatment device comprising a mixing tank comprising an inlet path (12) for an effluent to be treated, an optional inlet path (13) for reagents, a stirring source (14) for generating a turbulent stir in a given volume of said tank, an extraction path (15) for discharging sludge, and an extraction path (16) for treated effluent, and further comprising above and adjacent to the given volume, but below the treated-effluent outlet path, a settling structure (17) comprising a plurality of ducts extending from the bottom to the top and arranged in the form of a baffle so that no particle can flow through said layer along a rectilinear path.

20 Claims, 5 Drawing Sheets

Figure 1:
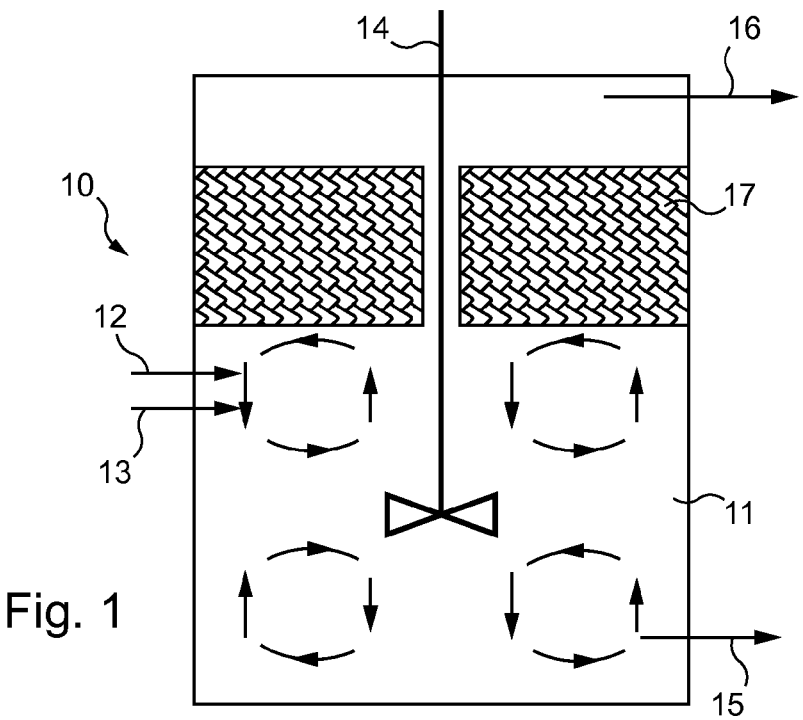

(51) Int. Cl.
*C02F 5/06* (2006.01)
*C02F 1/00* (2006.01)

(52) U.S. Cl.
CPC ..... *B01D 21/0045* (2013.01); *B01D 21/0051* (2013.01); *B01D 21/0057* (2013.01); *B01D 21/0069* (2013.01); *C02F 5/06* (2013.01); *C02F 1/52* (2013.01); *C02F 2001/007* (2013.01); *C02F 2301/024* (2013.01)

(56) References Cited

U.S. PATENT DOCUMENTS

| | | | |
|---|---|---|---|
| 4,975,101 A | | 12/1990 | Swanborn |
| 5,089,136 A | | 2/1992 | Cyr |
| 5,972,062 A | | 10/1999 | Zimmermann |
| 6,309,553 B1 | * | 10/2001 | Lanting ................. B01D 3/009 |
| | | | 210/521 |
| 6,517,714 B2 | | 2/2003 | Streat |
| 6,689,277 B2 | | 2/2004 | Streat |
| 6,919,031 B2 | | 7/2005 | Blumenschein |
| 2002/0158025 A1 | * | 10/2002 | Streat ................ B01D 21/0006 |
| | | | 210/738 |
| 2007/0114184 A1 | | 5/2007 | Essemiani |

FOREIGN PATENT DOCUMENTS

| | | |
|---|---|---|
| FR | 2395061 | 1/1979 |
| WO | 0139865 A1 | 6/2001 |
| WO | 0151868 A1 | 7/2001 |
| WO | 2011061553 A1 | 5/2011 |

* cited by examiner

U.S. Patent  May 16, 2017  Sheet 1 of 5  US 9,650,268 B2

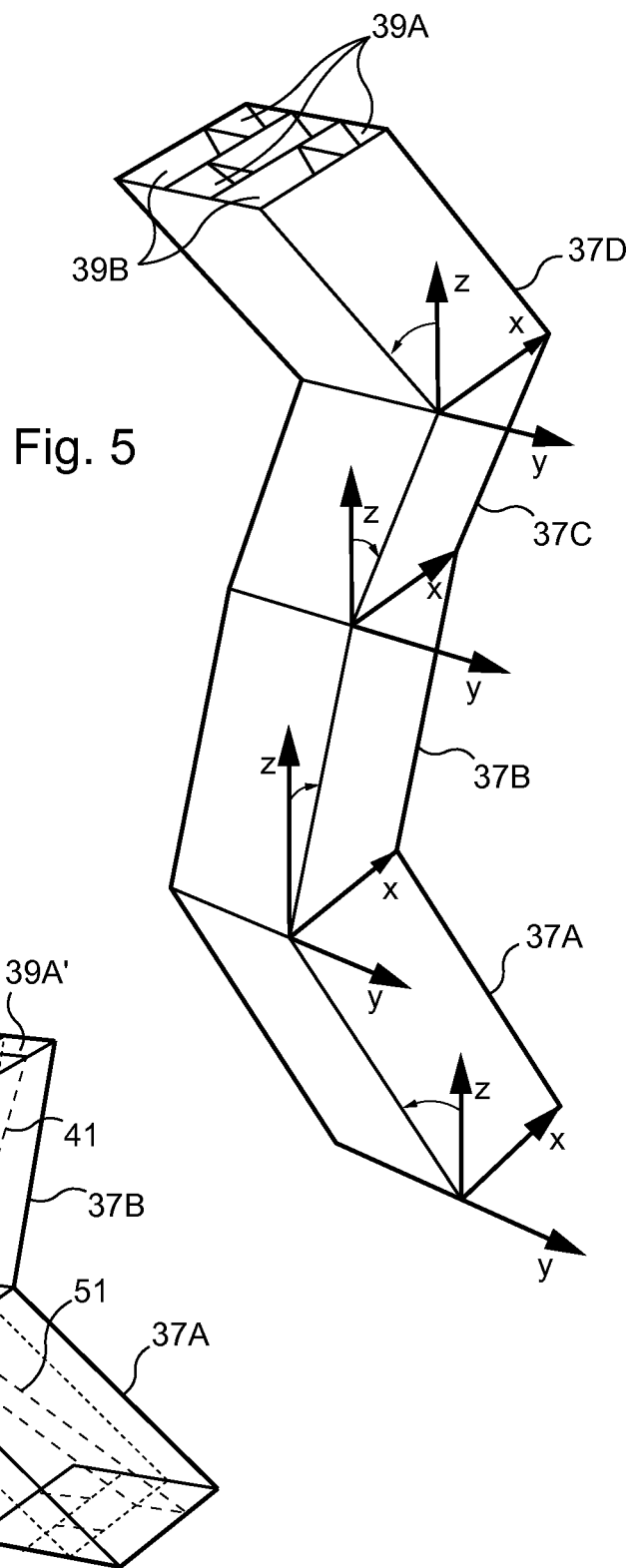
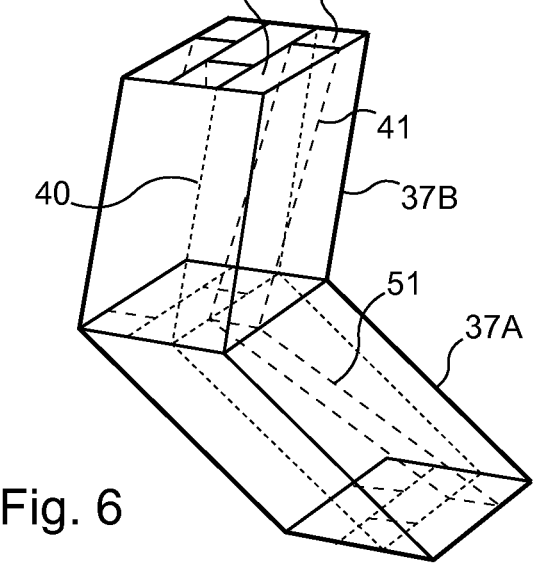
Fig. 5
Fig. 6

COMPACT WATER TREATMENT DEVICE

This application is a U.S. National Stage Application of PCT Application No. PCT/FR2013/050689, with an international filing date of 28 Mar. 2013. Applicant claims priority based on French Application No. 1253117 filed 4 Apr. 2012. These applications are incorporated herein by reference in their entirety.

The invention concerns the field of water treatment, whether that water be industrial (used water and so-called "process" water), or municipal (waste water or drinking water) and is more particularly directed to a particularly compact device for treatment of water, particularly for example by precipitation.

Conventionally, the elimination of undesirable components from water may be carried out by physico-chemical treatments of the insoluble salts (precipitation) and/or of the particles in suspension (coagulation, flocculation); for example, a reduction in the hardness is obtained by precipitation of calcium and/or magnesium salts in a softening treatment or a reduction of matter in suspension or colloids is obtained through clarification.

Such treatments usually begin with a reaction step in a mixing tank in which precipitation and/or coagulation and/or flocculation reagents are added; a stirring device is put in place within the mixing tank (stirrer, static mixer, etc.) to enable the mixing of the reagents and the reaction products (liquids and/or solids); according to the type of undesirable compounds to eliminate, a crystallization, precipitation, or coagulation flocculation reaction is thus obtained. A second step termed clarifying step is necessary to separate the reaction products (crystals, flocs, etc.) from the treated water; this second step generally consists of decanting the particles formed into a second tank which, unlike the first, has settling zones of low turbulence intensity the presence of which is necessary for decantation of the particles. The separation may be obtained due to the low turbulence intensity present in said tank or, for example, by means of a device formed from parallel plates, called a lamellar decanter. There may be recirculation of the reaction products (sludge or crystals) from the decanting zone to the mixing zone. When it is envisioned to perform both steps in the same large-sized tank, settling of the effluent containing the flocs or particles in suspension still takes place before its passage into the decanter, whether or not it is lamellar.

Although the concept of sludge usually covers an accumulation of flocs, this concept will be used below to designate all the types of reaction products (including crystals, in the case of softening).

Various installations have been commented upon, in particular in the documents EP-1 330 414 EP-0 423 964 or FR-2 863 908 (corresponding to U.S. Pat. No. 7,648,638). Reference may also be made to the article "Developments in precipitation engineering for the process intensification in the environmental protection and other purification industrial activities" by Plasari et al., published in Chemical Engineering Transactions, vol 11, 2007.

It can be understood that the obligation to provide different chambers (or at least different zones) for the mixing (with stirring) and for the separation (prior settling, with as little turbulence as possible) or at least to provide a transition zone between the mixing zone and the decantation zone (for the settling) leads to high volumes and bulkiness.

The invention relates to a structure for a water treatment device enabling a reduction in the volume and cost relative to a current device with the same function, at similar water throughput and quality.

To that end it provides a water treatment device comprising a mixing tank provided with an inlet path for an effluent to treat, an optional inlet path for reagents, a source of stirring capable of inducing turbulent stirring in a given volume of that tank, an extraction path enabling the discharge of reaction products, and a treated effluent extraction path, further comprising, above the inlet path for effluent to treat and the optional inlet path for reagents, and above and adjacent to the given volume, but below the outlet path for a treated effluent, a settling structure constituted by a plurality of flow channels going from bottom to top and which have a baffle configuration such that no particle can pass through that layer along a rectilinear path, whereas the fluid streams leaving that settling structure form the treated effluent.

The reagent inlet path is optional in that the presence of reagents is not always necessary, it being possible for the reaction to take place in contact with the reaction products already present in the tank; furthermore, the reagents, when they are necessary, may have been injected into the effluent before its entry into the device. However, in the particular case of a treatment by precipitation, the reagent inlet path is present to ensure that the precipitation does indeed take place in the mixing tank; this corresponds to a particularly compact configuration.

Thus the invention teaches to combine, in adjacent relationship (and thus contrary to conventional practice), a zone of turbulent mixing, and a layer formed of channels in a baffle arrangement.

It has become apparent that such a configuration of the settling layer enables a very significant reduction in the turbulence intensity, giving better performance (with a similar height of tank):

compared with a device without any settling layer,
compared with an existing conventional decantation device (for example with lamellar decanter lamellae having the same volume as the settling volume).

It should be noted that, according to the invention, there is no decanter in addition to the settling structure.

It has also become apparent that such configuration makes it possible to dissociate the hydraulic residence time and the residence time of the crystals/sludge formed, makes it possible to increase the growth of the crystals/sludge (which does not occur in conventional coagulation/flocculation) and thus to obtain a solid suspension of greater particle size, which:

makes it possible to have a higher density than previously,
enables sludge to be produced of very high dryness without press filter treatment and/or addition of flocculent,
has a narrower particle size distribution, which is always beneficial for the possible re-use of the crystals (gypsum, calcium carbonate).

Furthermore in the case of softening, the reaction may take place without any coagulant/flocculent contrary to the conventional methods.

The proximity of the turbulent zone and the settling layer results in that settling layer acting in the manner of a hydrodynamic barrier which retains the reaction products; more particularly, it has been found that these reaction products as a whole only enter the settling layer over a small height, of the order of a few centimeters, which tends to establish that the settling layer induces different phenomena to those caused by a set of lamellae.

Above the settling layer, it has been found that the mass of water was substantially cleared of all the reaction products placed in suspension on account of the reaction in the mixing volume, as if decantation had been carried out, and was practically free of turbulence. This explains why, as was mentioned above, there is no decanter in addition to the settling structure.

In fact the use of a superposition of two lamellar blocks having different inclinations apparently to the extent of avoiding the passage of a particle through the stack along a rectilinear path has already been observed in document EP-0 423 964, but that is a device the function of which is to provide decantation of a liquid already entering into contact with the particles in suspension (there is thus a clear dissociation between the mixing zone (if the particles in suspension result from a reaction) and decantation after prior settling). The liquid containing particles in suspension is not subjected to stirring as taught by the present invention. Furthermore, it is stated in that document that the lower lamellar block is situated in a sludge bed whereas the lamellae of the upper block are substantially closer together than the lamellae of the lower block, which rules out the principle of channels in a baffle arrangement (especially as the inclination of the lamellae of the upper block takes place in a vertical plane perpendicular to that in relation to which the lamellae of the lower block are inclined). It may furthermore be noted that this document teaches that, either the upper structure is remote from the lower structure, or it overlaps with it.

As regards document US-2002/0158025, this teaches the principle of a tank comprising a turbulent flocculation zone surmounted by a clarification zone with, between those zones, an arrangement for turbulence control; various forms are proposed for such an arrangement one of which comprises two sets of deflectors which oppositely inclined while having a small spacing; the vertical separation between these assemblies appears to be substantial without, however, suggesting any kind of network of channels in a baffle arrangement.

Another document, U.S. Pat. No. 4,142,970, appears to have a two-stage structure of inclined plates having different inclinations, but in a very different configuration to that of the invention since the effluent to treat enters the tank concerned from the top, such that the treated effluent is collected in the lower part of the structure.

It should be stressed here that turbulence phenomena are so complex that it is generally considered that extrapolation cannot be made of the phenomena that occur in a particular configuration based on what occurs in a different configuration.

No explanation has been established for the particularly good results obtained by virtue of the configuration of the invention, but one hypothesis is that the configuration of the invention, thanks to the presence of channels in a baffle arrangement, hinders the rising movement of the particles, without however hindering the hydraulic flow as much, such that, contrary to all expectations, the changes in direction within the channels remain compatible with settling of the hydraulic flow, even at high speed.

The concept of passages, or even of channels, in a baffle arrangement, has already been proposed in the field of the separation of two fluids, as shown by documents FR-2 395 061, U.S. Pat. No. 4,975,101, U.S. Pat. No. 5,972,062, WO-01/39865, EP-0 361 225, WO-01/51868. It is however important to note that these documents concern the trapping of water droplets in a gaseous flow, the form of the channels in a baffle arrangement serving to increase the frequency of collision of the droplets with the walls of the baffles, and the objective being to maximize the specific surface area (per unit volume of the separator); yet such separation is of a very different nature to that which is necessary for the separation of the particles in suspension generated by the water treatment reactions since, in particular, the densities of materials to separate in the case of gaseous flows charged with droplets are in a ratio of the order of 1:1000 whereas the densities of the materials to separate in the case of a separation of water/particles in suspension are only in a ratio of the order of 1 to 10 (i.e. of the order of 100 lower than in the gas/droplets case); furthermore, the viscosity of the gases to be rid of the droplets they contain, in practice of the air, is scarcely of the order of $10^{-5}$ Pa·s, whereas the viscosity of water is of the order of $10^{-3}$ Pa·s (i.e. of the order of 100 times greater than in the case of the air; lastly, the droplets in the gases in practice correspond to levels of charge not exceeding of the order of 1% (mass of water per volume of air) whereas the levels of charge in the water containing reaction products may fluctuate through very wide ranges, which may go from 0.01% to 90%, in practice from 0.01% to 50%. As regards the speed of flow, it should also be noted that it is greater than 1 m/s in the case of dehumidification, whereas it is in practice less than 0.05 m/s (that is to say less than 180 m/h) in water treatment (in particular in the context of the invention). It can be understood that the phenomena implemented in the dehumidification of gaseous streams and in the separation of the reaction products of a water treatment are fundamentally different and that the solutions adopted in one of these fields have no reason to be of any advantage in the other field.

The concept of a passage in a baffle arrangement can cover a great variety of configurations; thus it may comprise undulations in a given plane, in practice vertical when the settling layer is in place in a device according to the invention, which corresponds to a particularly simple geometry. It may also comprise baffles in a spiral arrangement, which corresponds to undulations in three spatial dimensions. Furthermore, whatever the configuration of the baffles (in two dimensions or in three dimensions), the channels may be of substantially uniform cross-section, or on the contrary have fluctuations in cross-section, either in a single direction (increase from bottom to top, or even the contrary), or with increases and reductions.

For reasons of ease of construction, the channels in a baffle arrangement are advantageously delimited by planar walls, which optimizes the use of the volume of the settling layer (each wall delimits two channels). In other words, the channels are advantageously formed by a succession of rectilinear segments. These planar walls are smooth in practice.

The channels advantageously comprise at least two segments inclined relative to the horizontal, that are contiguous or possibly separated by a vertical segment.

In practice, the transverse dimensions of the channels are less than 20 cm, for example of the order of 5 to 10 cm.

It is to be noted that the principle of channels of variable cross-section was already known per se, for example according to several of the documents cited above in relation to the dehumidification of gaseous streams.

The mixing zone may comprise mechanical members contributing to guiding the flow of the effluent and of the reagents within itself; it may advantageously be a central tube guiding the streams in a preferably rising direction, and causing dispersion of the stream in the lower part; It may be a flow-guide in accordance with the teaching of document FR-2 863 908 (or U.S. Pat. No. 7,648,638) already cited.

Turbulence in the upper zone is advantageously less in a ratio of at least 10 than the turbulence of the effluent charged with reaction products situated immediately below the settling layer.

Thus, according to preferred features of the invention, which may be combined:

the channels have a baffle configuration parallel to the same plane, which corresponds to a configuration that is simple to manufacture, and thus of moderate cost; as a variant, the channels have a baffle configuration in several transverse directions, which contributes to better settling; in such a case, the channels advantageously have a helical configuration, the channels have a uniform cross-section from the lower face of the structure to its upper face, which corresponds to very simple manufacture; however, as a variant, the channels have a cross-section which varies over at least part of the height of the settling structure, which contributes to improving the settling effect due to the variation in local speed so induced, the channels have an inclination comprised between 35° and 85° relative to the horizontal, which it has become apparent leads to settling structures that are reasonable at industrial scale.

Advantageously, in particular for considerations of feasibility, the settling structure is formed of superposed layers within which the channels are formed from rectilinear sections.

In this case, the settling structure advantageously comprises at least two layers within which the sections of channel are inclined relative to the horizontal, in different directions. These two layers comprising sections inclined relative to the horizontal may be separated by a layer in which the sections are vertical.

As is also advantageous for reasons of manufacture, the inclined sections have the same inclination to the horizontal in at least two layers (in the same plane (in opposite directions), or not).

Preferably, the channels are of variable cross-section within at least one of the superposed layers.

Whether or not the channels are of uniform cross-section, it is advantageous for the channels to be formed by planar walls.

Preferably, the device advantageously comprises a flow-guide around the stirring source. The settling structure is then advantageously situated at a distance from the bottom comprised between 50% and 100% of the sum (2 H+D) if H is the height of the flow-guide and D is the hydraulic diameter. The hydraulic diameter is by definition equal to 4× the wetted area/wetted perimeter. The reactor may be square-based or circle-based. For a cylinder-based reactor, the hydraulic diameter is the diameter and for a square-based reactor, it is the length of one side.

When the stirring, within the flow-guide, is downwards, it is advantageous for the injection of the effluent to treat (as well as the reagents, especially in the case of a precipitation treatment) to be made between that flow-guide and the settling structure, in practice opposite the upper inlet of that flow-guide.

Advantageously, with or without flow-guide, the settling structure is situated above the bottom of the tank between 0.25 and 3 times (and preferably between 0.5 and 1.5 times) the hydraulic diameter of the tank, which amounts to saying that the mixing volume, under the settling layer, is of the same order of height as its width (in practice the hydraulic diameter) which contributes to establishing the conditions of high turbulence up to the immediate proximity of the settling structure.

Although the comments below apply to treatments by coagulation-flocculation, or by precipitation, the invention is especially advantageous in the case of precipitation, directed to precipitating dissolved pollution.

Figure 2:
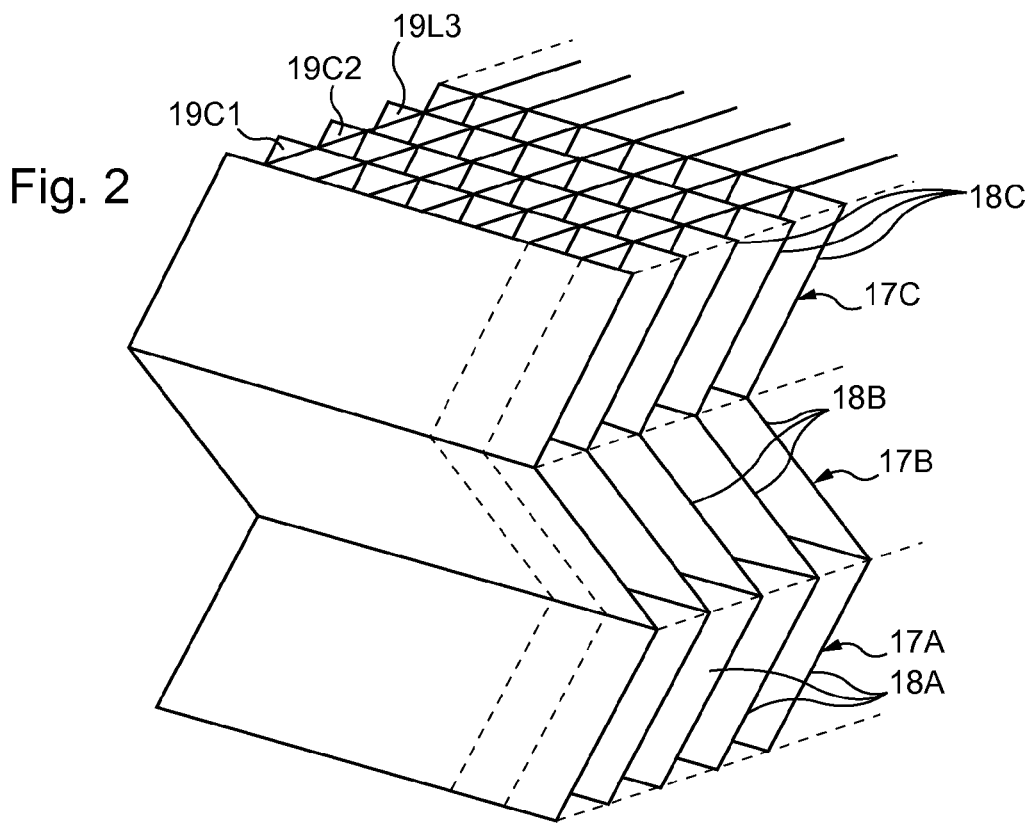
Figure 3:
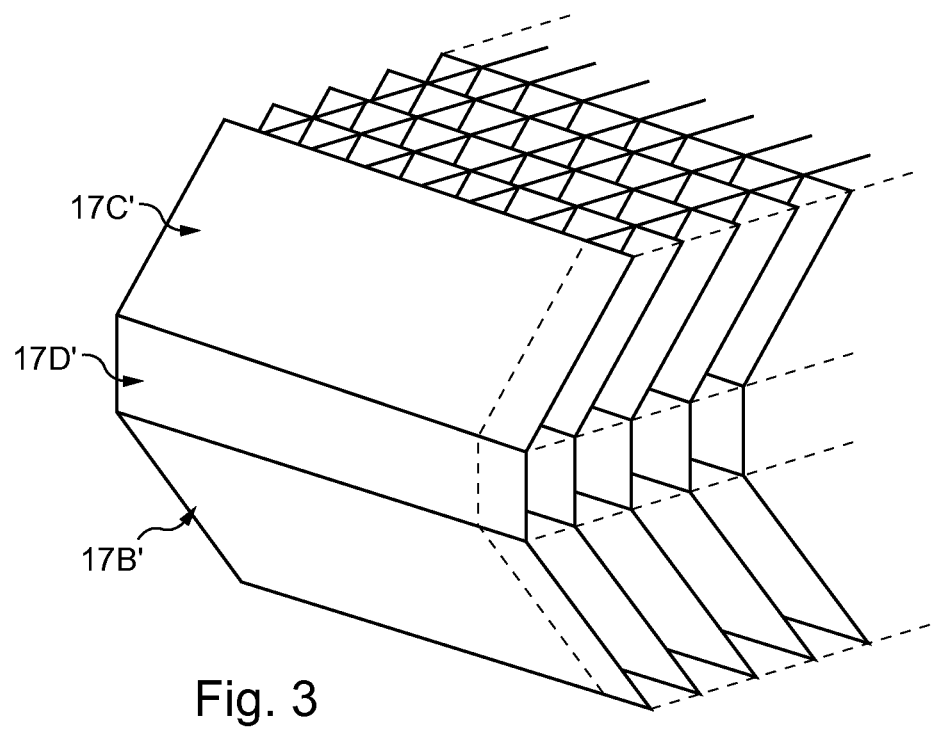
Figure 4:
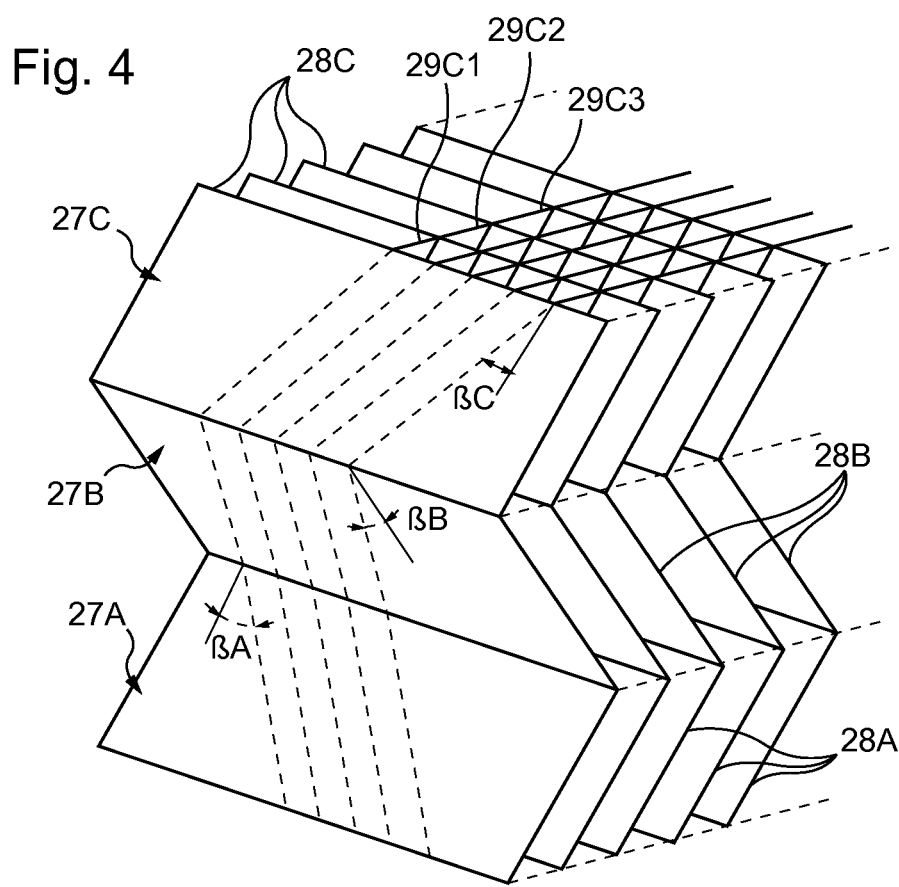
Figure 7:
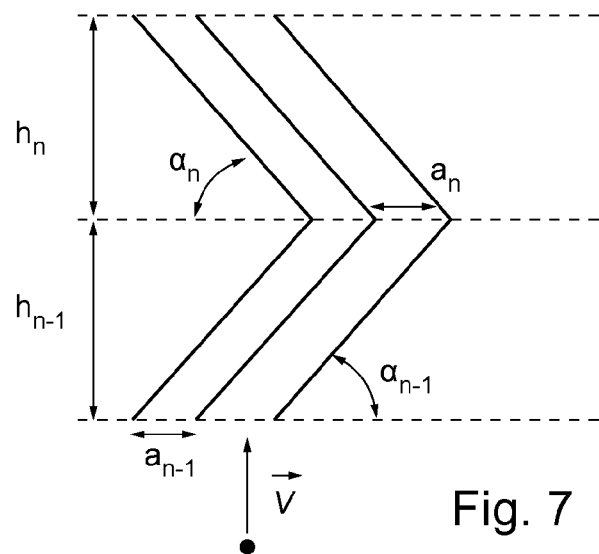
Figure 8:
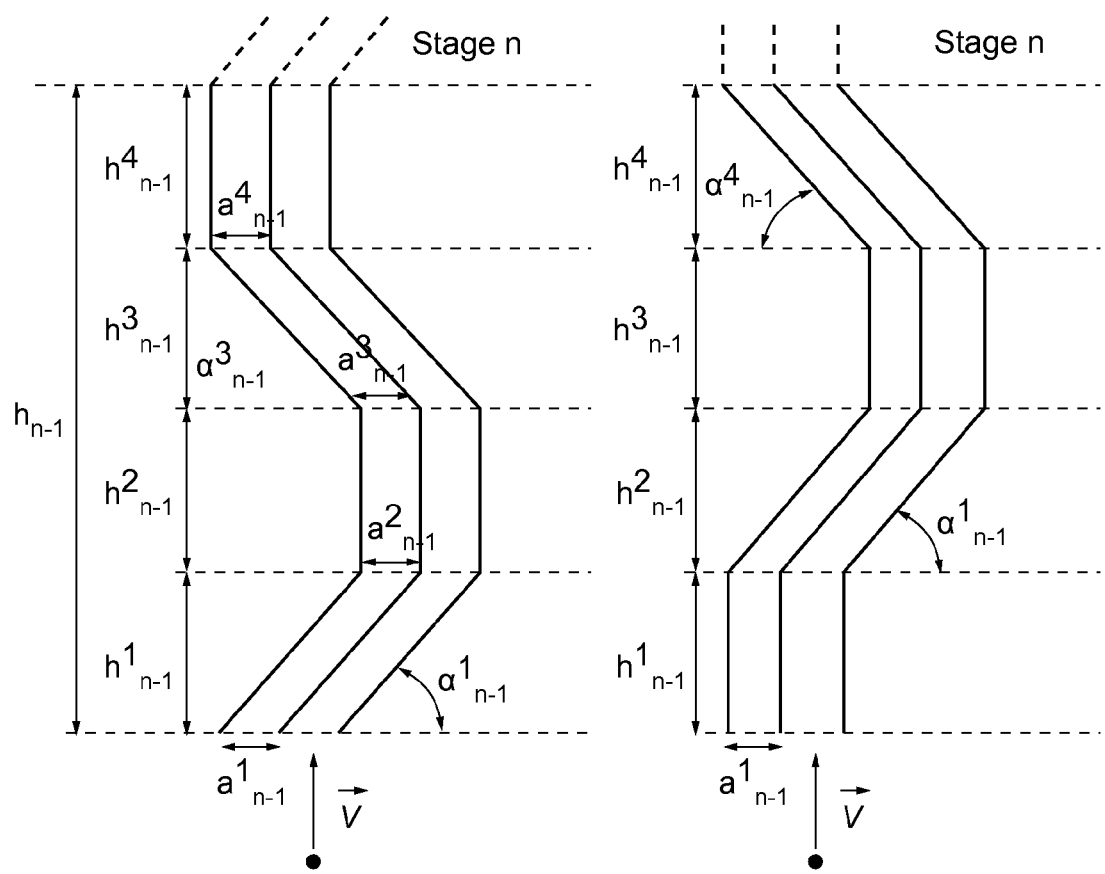
Figure 9:
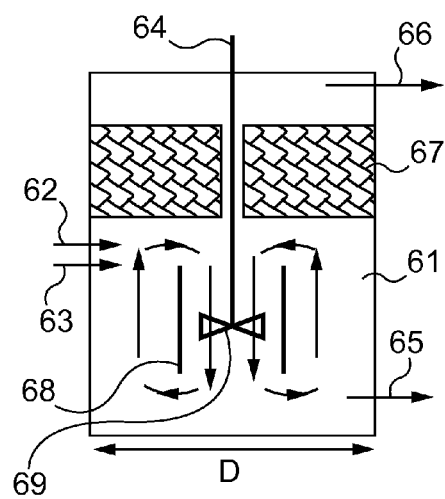

Thus, according to another aspect, the invention provides a method of treatment by precipitation of a treated effluent containing dissolved pollution, wherein that effluent and precipitation reagents are injected into a tank in a given volume of which turbulent stirring is induced, that effluent, in which precipitation has been induced by the reagents, is made to flow from bottom to top through a settling structure situated above and adjacent to that given volume and constituted by a plurality of flow channels going from bottom to top and which have a baffle configuration such that no particle can pass through that layer along a rectilinear path, whereas the fluid streams leaving that settling structure form a treated effluent which is extracted at a level situated above that structure whereas sludge is extracted at a lower part of said given volume, Objects, features and advantages of the invention will appear from the following description, given by way of illustrative non-limiting example with reference to the accompanying drawings in which:

FIG. 1 is a synoptic diagram of an installation unit in accordance with the invention, FIG. 2 is a partial diagrammatic view in perspective of a first possible configuration for a settling layer or structure of an installation unit in accordance with the invention, FIG. 3 is a diagrammatic view of a variant of the configuration of FIG. 2, FIG. 4 is a diagrammatic view in perspective of a second possible configuration for a settling layer or structure of an installation unit in accordance with the invention, FIG. 5 is a diagrammatic view in perspective of a third possible configuration for a settling layer or structure of an installation unit in accordance with the invention, FIG. 6 is a partial view of FIG. 5, FIG. 7 is a diagram showing various parameters characterizing the configuration of FIG. 2, FIG. 8 is a diagram showing various parameters characterizing the configuration of FIG. 6, and FIG. 9 is a synoptic diagram of a preferred embodiment of the installation of FIG. 1.

By way of example FIG. 1 represents an installation unit for water treatment (called a reactor below, for short) designated overall by reference 10, comprising a mixing tank 11 provided with:

an inlet path 12 for an effluent to treat,
a possible reagent inlet path 13,
a stirring source 14 capable of causing turbulent stirring in a given volume of that tank,
an extraction path 15 enabling the discharge of sludge separated within that installation unit,
an extraction path 16 for a treated effluent.

The inlet paths 12 and 13 are dissociated here and may be situated at any location of the tank (subject to being able to put in place a settling zone—see below); as a variant, the injection of the reagents may be made upstream, for example in the piping bringing the effluent to treat. It may furthermore not be necessary to introduce particular reagents (case of softening by spontaneous de-supersaturation of saturated solution in particular; in such a case, the reaction products (crystals) formed at a given time may serve as reagents for what follows).

The stirring source here is schematized by a central stirrer with a single blade inducing movements upwardly and downwardly from the level of that blade; as a variant, it may be a plurality of stirrers, which may or may not be mechanical; when they are mechanical stirrers, they may have a single blade or a plurality of blades. Depending on the inlet throughput of the effluent and any reagents, the source of stirring may be constituted by that inlet throughput itself, if it is already very turbulent. Preferably, the main flow direction in the vertical movement of the mass of fluid is directed downward.

The extraction path 15 is in the lower portion. More particularly, depending on the configuration of the bottom of the tank, and taking into account that despite the stirring, there may be "sludge" which agglutinates at the bottom of the reactor, this may be collected by a scraper system, for example a turntable (not shown), before being discharged in the lower part of the tank using, for example, a pump or an endless screw.

Extraction path 16 for the treated effluent takes place in the upper part, for example by slotted channels or perforated channels or tubes.

A settling structure (or layer) 17 is situated above and adjacent to the volume stirred by the stirring source but below the extraction path 16 for treated effluent, and serves to settle hydraulic conditions (physical barrier against the turbulence generated by the mixing) whereby in a single tank, it is possible to associate:

a stirred reaction step in which possible agents for precipitation and/or coagulation and/or flocculation are added.

clarification with the aim of separating the sludge (reaction products such as crystals, flocs, etc) from the tested water.

The settling structure is situated between, on the one hand, the inlet paths 12 and 13 (when the latter exists) and sludge extraction path 15, and on the other hand, the treated effluent path 16. The settling layer is thus covered by a layer of water from which leaves that extraction path 16.

As will be detailed below, this settling structure 17 is constituted by a plurality of flow channels going from bottom to top and which have a baffle configuration such that no particle can pass through that layer along a rectilinear path. There is no decanter above that settling structure. To be precise, the fluid streams leaving that structure constitute the treated effluent which is extracted via the extraction path 16.

This settling layer has a total projected area (sometimes denoted TPA for short) that is high per m$^3$ of material within that layer. The hydrodynamic conditions generated by such a structure composed of channels in baffle arrangement giving rise to non-linear flow (in contrast to a conventional lamellar decanter) enabling the propagation of the turbulence intensity in the material to be significantly reduced, this being all the more the case in the upper layer of water. To take account of the fact that, due to the baffle configuration, certain channels may not lead to the periphery (at the bottom or at the top), this concept of total projected area here designates the operational or effective projected area (thus without taking into account blind channels.

It is to be noted that it has not been possible to clearly identify (experimentally or by digital simulation) the relationship of cause and effect between the geometry of the channels defined by said invention and the measured results/ efficacies. It is to be recalled that the turbulence phenomena are sufficiently complex for it to be generally difficult to extrapolate the effects of a change made to a configuration tested experimentally or to simulate with precision the effects of a given configuration.

FIG. 2 diagrammatically represents a first preferred configuration of the channels of a settling structure according to the invention.

It can be seen that this layer is formed from three superposed zones denoted 17A, 17B, 17C, each formed from parallel plates 18A, 18B 18C (referred to as main plates), which are inclined to the vertical direction, and between which are disposed vertical strips of which the only ones visible are those of the upper layer 17C under the references 19C1, 19C2, etc. (the plot of a few strips situated behind the first plates of each zone is furthermore represented in dashed line). There are three superposed zones here, but this number may vary according to needs and according to the available space; there may thus be only two superposed zones, or there may be a number equal to or greater than 3. The plates and strips define channels formed from sections that are rectilinear here within each of the superposed zones. More particularly, each plate or strip of one zone is joined to a plate or strip of the zone situated above or below the zone considered.

The inclinations alternate here in direction from one zone to the next, with reference to the same plane parallel to the arris lines, that is to say, in the example considered, the plates of the lower zone 17A are inclined upwardly and to the right, the plates of the intermediate zone 17B are inclined upwardly and to the left and the plates of the upper zone 17C are again inclined upwardly and to the right.

This concept of right and left is used here with reference to a fictional plane parallel to the arris lines of junction between the zones of plates.

Preferably, the inclinations have the same value, the sign being the only difference. Of course, as a variant, the inclinations may alternate with different values from one zone to the next.

The strips disposed between the plates 18A, 18B, 18C here are not only vertical (and thus parallel) here, but in addition are distributed in batches of coplanar strips, which is the case here for strips 19C1, 19C2, 19C3. These strips may form part of plates of larger size assembled with the plates 18A, 18B, 18C, etc. These strips may as a variant be offset from one channel to the next, for example based on a staggered configuration.

As these strips are parallel within a zone, they define, together with the parallel plates 18A, 18B, 18C, channels of uniform cross-section from bottom to top. This cross-section (which is perpendicular to the strips and to the plates) thus has four sides, which may or may not be equal.

It is to be noted that the strips are parallel to each other in all the zones, such that the overall inclinations of the various channels within the layer may be defined with reference to a plane (in a plane to which the vertical strips are parallel).

When the parallel strips are perpendicular to the main plates, the channels are of rectangular or even square cross-section. However, as a variant, these channels may have a rhomboid cross-section.

As a variant, the channels have a cross-section which is polygonal with more than four sides, for example hexagonal, in which case the main plates have a corrugated rather than planar profile.

The various channels advantageously are of identical cross-section within each zone. As a variant, it is however possible to have variations in cross-section according to the position of the various channels within the future installation, for example according to whether the channels are situated in a central or peripheral region of the installation unit.

As set out below, the channels may also have variable cross-sections between the top and bottom of each zone.

The channels may be formed by the assembly of plates and strips that are planar or corrugated (for example sinusoidal), but may also be formed by extrusion, in which case each of the layers 17A, 17B or 17C may be formed by the assembly of blocks of channels obtained by extrusion.

According to an alternative, the zones may also be formed by the assembly of tubes (in a ratio of one tube per channel) of some cross-section or other, for example cylindrical tubes assembled in a staggered arrangement.

As a matter of fact, the concept of plate and of strips used above is only used here to explain the structure of the zones 17A, 17B or 17C without this implying that the manufacture of these zones has to be carried out based on such plates or strips.

FIG. 3 represents a variant embodiment of the configuration of FIG. 2 in which parts similar to those of FIG. 2 are designated by reference signs which are derived from those of that Figure by the addition of the "prime" symbol. This variant has the particularity that, between the zones having inclined plates 17B' and 17C', an intermediate plate 17D' is provided which is formed from vertical plates and strips.

FIG. 4 represents another settling layer configuration.

As for the configuration in FIG. 2, this second configuration comprises several superposed zones, denoted 27A, 27B and 27C (indeed, in the example represented here, there are three zones) each comprising a plurality of parallel plates, referred to as main plates, denoted 28A, 28B or 28C according to the zone considered. As in the example of FIG. 2, the inclination of the plates changes direction from one zone to the next (relative to a plane passing by the arris lines of junction between the plates of the various zones; the above comments made in relation to plates 18A, 18B or 18C apply here.

As in the configuration of FIG. 2, the structure of this FIG. 4 comprises strips (which are parallel within each zone) situated between adjacent plates, of which three are designated under the references 29C1, 29C2 and 29C3.

The comments made above in relation to the strips 19C1, 19C2, 19C3, etc. of FIG. 2 also apply here, in particular in relation to the fact that they are advantageously distributed in batches of coplanar strips.

As previously, the plates or strips of one zone are attached to a plate or strip of an adjacent zone.

However, as shown by looking at the plot, in dashed line, of the strips on the first plates of each zone, these strips are themselves inclined relative to a vertical line; thus the strips of the zone 27A are inclined at an angle βA relative to a vertical plane that is transverse to the plates 28A, whereas the strips of the zone 27B are inclined at an angle βB relative to a vertical plane that is transverse to the plates 28B and the strips of the zone 27C are inclined at an angle βC relative to a vertical plane that is transverse to the plates 28C.

The direction of inclination may be arbitrary, since the inclination in zone 27A is oriented upwardly and to the left, that of the zone 27B is oriented upwardly and to the right and that of zone 27C is also oriented upwardly and to the right. It is however preferable for the inclination to change direction between one zone and another adjacent zone. The inclination value can remain the same, or not, on changing the direction of inclination.

The overall inclinations of the channels so formed by the combination of the aforesaid plates and strips are thus, with the exception of the case in FIG. 2 (in which the strips are vertical and parallel from one zone to the next), to be defined in a three-axis system.

Another structure configuration with inclinations in several planes is represented in FIG. 5.

In the interest of simplicity, this Figure only represents one module of the full structure, i.e. a module formed from six channels within a stack of four sub-modules 37A, 37B, 37C and 37D (in practice, these modules are reproduced within each zone, all the sub-modules that are similar to the sub-module 37A forming a first zone, which can be assimilated to zone 17 of FIG. 2, all the sub-modules that are similar to the sub-module 37B forming a second zone and so forth, the outer walls of the sub-modules being parallel from one sub-module to the next within each zone.

If reference is made to the reference system appearing in each end plane of each layer, it can be seen that sub-module 37A presents an inclination γ1 relative to the vertical z-axis in the plane (y,z); sub-module 37B presents an inclination 2 relative to the z-axis in the plane (x,z); sub-module 37C presents an inclination 3 relative to the z-axis in the plane (y,z) and the sub-module 37D presents an inclination 4 relative to the z-axis in the plane (x,z). As in the example of FIG. 4, the inclinations are thus defined in three dimensions.

It can be understood that, since the inclinations in the plane (y,z) of the sub-modules 37A and 37C are of opposite direction, as are the inclinations in the plane (x,z) of the sub-modules 37B and 37D, a helical overall shape is obtained.

It may be observed in the upper part of FIG. 5 that the sections through which the channels emerge are not all equal; thus channels which emerge in the upper plane of the structure through rectangular openings designated by the reference 39A may be distinguished from channels which open in that plane by smaller openings (here with a ratio approximately equal to 2; these sections are at least approximately square) designated by the reference 39B.

These channels may have such a section 39A or 39B over their entire height through various zones.

However, advantageously, these channels have variations in section, being delimited by walls that are inclined relative to the walls of the respective sub-modules. Thus, in FIG. 6 which represents an extract from the module of FIG. 5, that the openings situated at the right-most top of sub-module 37B i.e. the openings designated under the references 39A' et 39B' are delimited by the right wall of the sub-module 37B, the front and back walls of this sub-module, an intermediate wall 40 parallel to said right wall and by an inclined wall 41, inclined relative to said front and back walls. Thus, the structure is characterized not only by the inclinations of the various sub-modules (commented on above), but also by the inclination of the inside walls which causes a variation in section of those channels.

What has just been described for the sub-module 37B (the inside wall 41 presenting a different inclination from that of the front and back walls compared with the z-axis in the plane (x,z)) also applies for the lower sub-module 37A (the inside wall 51 which connects at the upper part of the bottom of wall 41 also presenting an inclination in that plane (x,z) in complement to the inclination of its median line in the plane (y,z).

It goes without saying that the structures of FIGS. 2 to 4 may also be produced in the form of sub-modules similar to those of FIG. 5 or 6, with or without channels of uniform cross-section.

The diagram of FIG. 7 shows the various following concepts in the case of FIG. 2, i.e., in the analysis of a structure of n stages (or zones):

$\alpha_n$: angle of inclination of stage n (° deg)
$a_n$: hydraulic diameter of the channels of stage n
$h_n$: height of stage n
n: number of stages It is chosen to comply with the following relationship:

$$\overset{n}{\underset{n\geq 2}{\forall}}, a_n \leq \frac{h_n}{\tan\alpha_n} \text{ with } 35° \leq \alpha_n \leq 85°,$$

The compliance with such a relationship makes it possible to significantly reduce the propagation of the turbulence intensity in the structure constituting the settling layer, such that no particle can pass in a straight line through that structure (i.e. without at least once encountering a wall of the channel in which that particle is located).

FIG. 8 shows, in similar manner, the quantities defining a structure such as that of FIG. 5 (since there are inclinations in different planes, this FIG. 8 comprises two parts, describing the inclinations in the two vertical planes in which those inclinations are maximum, preferably perpendicular to each other):

$\alpha_n^i$: angle of inclination of level i of stage n (° deg)
$a_n^i$: the hydraulic diameter of the channels of level i of stage n
$h_n^i$: height of level i of stage n
n: number of sections/stages
i: number of levels per stage It is chosen to comply with the following relationship:

$$\overset{n}{\underset{i=1}{\forall}}, \overset{i}{\underset{i=1}{\forall}}, a_n^i \leq \frac{h_n^i}{\tan\alpha_n^i} \text{ with } 35° \leq \alpha_n^i \leq 85°$$

It should be noted that the choice of the range 35°-85° corresponds to a range of inclinations making it possible to satisfy the condition without requiring too great a height relative to the dimensions of the existing mixing tanks; this is thus a preferred range which it is of course possible to depart from, depending on needs or the available volume.

FIG. 9 represents an improved version of the device of FIG. 1. Parts similar to those of FIG. 1 are designated by reference signs deriving from those of that FIG. 1 by addition of the number 50.

It differs from the device of FIG. 1 by the presence of a flow-guide 68, preferably situated in a central zone of the mixing zone 61, around the stirring source 64, here around the blade 69 (or blades) of a stirrer constituting the source of stirring. This flow-guide promotes the obtaining of a vertical movement in a direction to which precedence is given, preferably downwards. The injection of the effluent to treat, as well as, preferably, that of reagents, is advantageously carried out at a level situated just below the settling structure, up to the upper opening of that flow guide.

This mixing reactor is thus provided with a structure for settling turbulence intensities (placed in its upper zone) as well as a stirrer and a flow guide enabling homogenous mixing of the particles in suspension as well as fast dispersion of the fluids entering the tank while reducing the shear forces (low stirring speeds).

The mixing tank is defined in particular by its hydraulic diameter D, as presented in FIG. 9 (the general definition of such a hydraulic diameter is reviewed above).

This flow guide, of height H, is advantageously positioned at 0.25 D from the bottom of the reactor (for example between 0.1 D and 0.5 D). This position and this height may be variable according to needs.

The settling structure is advantageously positioned such that its lower part is at a height greater than (0.25 D+H) from the bottom point of the reactor (preferably comprised between [0.5×(2 H+D)] and [(2 H+D)]).

Given that the height of the flow-guide is typically of the same order of magnitude as the hydraulic diameter (between 0.5 and 2 times that diameter), the settling layer is advantageously situated above a height comprised between 0.25 and 3 times that hydraulic diameter (preferably between 0.5 and 1.5 times that diameter).

The thickness of this settling layer is typically of the order of 0.5 to 1 times the hydraulic diameter, for example 0.5 to 0.7 times that diameter.

The structure of the settling layer may have any one of the configurations described above.

A few comments may be made with regard to the constitution of the reactors of FIGS. 1 to 9, with any one of the configurations.

First experimental tests have been carried out with materials having a channel width comprised between 2 and 4 cm. Industrially, by adopting the standard measurements for lamellar material used in water treatments, the widths of the channels should be able to exceed 5-10 cm, but it is also possible to use materials of smaller widths so long as that width complies with the dimensioning rules cited above (avoiding the passage of particles along a rectilinear path).

The association of two zones with contiguous oblique channels may be carried out directly (FIG. 2) or via a zone with vertical straight walls (of greater or lesser length) enabling them to be linked together (see FIG. 3) and/or via a zone having a curve avoiding the discontinuity of a sharp bend.

The overall height of the settling structure may vary according to the required effectiveness of settling turbulence (directly with the proportion of particles retained).

The nature of the material constituting the settling structure does not appear to have a significant influence on the effectiveness of the invention. The choice thereof may thus be made based on criteria of feasibility (manufacturing) and of economics. The materials that may be contemplated are mainly: thermo-formable plastic materials (PE, PVC, PVDF, etc.) and metal materials (manufacture by assembly) (steel, stainless steel, aluminum, etc.).

The surface roughness and texture of the material used for manufacture have an impact on the effectiveness of the invention. A material having smooth surfaces without projections is in practice more effective, since roughness and projections generate turbulence in channeled flow.

The channels have been assumed above to have a cross-section of low aspect ratio (length/width ratio, transversely to their maximum dimension along which the effluent flows), varying in the drawings between approximately 1 and 2; in practice, the distance between inclined walls appears to be more important than the transverse dimension.

The object is to be able to operate in particular between 0.01% by mass of Total Suspended Solids (TSS) and 90% by mass of TSS in the tank.

In operation by precipitation, a distinction is made relative to flocculation by preferentially targeting a minimum TSS threshold in the tank. It is therefore desired to keep a sufficient level of solids in the tank to enable sufficient growth in precipitates precisely for the reason of avoiding then having to treat the TSS by coagulation/flocculation, to have a majority of particles of sufficiently large size to be able to decant themselves.

A first digital simulation consists of modeling the experimental configuration described above (equipped with a settling structure in accordance with FIG. 2—referred to as geometry 1). The computation carried out concerns the hydrodynamics alone without taking into account the solid phase. Observation was made of the change in a value characteristic of the turbulence upstream and downstream of the separation zone: the turbulence intensity.

Turbulence intensity is defined at a point in the fluid as the ratio of the fluctuations in the velocity of the fluid at that point (around its temporal average) and that average velocity.

The results obtained are the following:

|  | Turbulence intensity (%) | |
| --- | --- | --- |
|  | Upstream of the settling zone | Downstream of the settling zone |
| Geometry 1 | 21.5 | 0.9 |

Upstream of the separation zone (under the settling layer), the high level of the turbulence intensity is due to the mixing system in the reactive zone. Downstream of the zone, the value close to 1% is characteristic of a fluid of low turbulence. The settling zone according to "Geometry 1" thus does indeed constitute a barrier to turbulence.

In a second phase, simulations were made, directed to comparing various configurations of the settling structure.

It was chosen to take a height for the settling layer having a ratio of 1 with the average transverse dimension of the mixing tank, with equal mirror velocities and 50 mm channels with a 50 mm spacing. The following table gives the effective projected total area and the real average velocity in four configuration cases: a conventional geometry with a settling block constituted by parallel lamellae and without any change in direction over the entire height, a first configuration referred to as "geometry 1" (see above), a configuration referred to as "geometry 2" corresponding to FIG. 5 bit with channels of uniform cross-section and a configuration referred to as "geometry 3" corresponding to FIG. 5, with a variation in the angles of the channels between 50° and 70° arising from the variability in the inside diameters.

|  | Projected total area | True average velocity |
| --- | --- | --- |
| Conventional geometry | 5.45 m² | 9 m/h |
| Geometry 1 | 9.9 m² | 3-6 m/h |
| Geometry 2 | 9.5 m² |  |
| Geometry 3 | 9.2 m² |  |

The above table shows that the velocities for the fluid rising within the separation zone are divided by two or even three for geometries 1, 2 and 3 relative to the geometry constituted by parallel lamellae and without any change in direction reducing the propagation of the reactor turbulence in the material and thus retaining more solid particles.

The results concerning the turbulence intensity prove that geometries 1, 2 and 3 constitute a more effective barrier to the turbulence that the geometry constituted by parallel lamellae without change in direction. To be precise, in the intensified operating conditions of the method (high throughputs and mixing); this so-called conventional geometry does not constitute a good separation zone (5% turbulence intensity).

The increase in the ratio (height of structure)/(hydraulic diameter) from 0.6 to 1 has enabled the turbulence intensity to be reduced (from 1.3% to 0.9%).

|  | Turbulence intensity (%) | |
| --- | --- | --- |
|  | Upstream of the separation zone | Downstream of the separation zone |
| Without separation zone | 21.5 | 17.6 |
| Conventional geometry | 21.5 | 5.5 |
| Geometry 1 | 21.5 | 0.9 |
| Geometry 2 | 21.5 | 0.8 |
| Geometry 3 | 21.5 | 0.6 |

The values of turbulence intensity upstream of the separation zone correspond to the operating conditions, which are conventional per se, used in experimental tests (stirrer type, speed of stirring, etc.).

The settling structure described above may however also be used in other operating conditions leading to higher values of turbulence intensity upstream of the zone (these values may be situated between 25 and 75%).

The invention is particularly adapted to precipitation treatments, in the case of effluents containing dissolved pollution, which must be precipitated to be eliminated; it is usually considered that a higher reactor volume is required to treat an effluent containing dissolved pollution than an effluent containing pollution that is mainly constituted by suspended matter.

The configuration tested has the following characteristics, in a practical case which is of particularly high desirability, for the elimination of soluble inorganic pollution by precipitation:

precipitation reactor provided with a settling structure according to FIG. 2, according to the configuration of FIG. 9, enabling homogenous mixing of the particles in suspension as well as rapid dispersion of the fluids (effluent to treat and crystallization reagents (for example lime milk) entering inside the tank while reducing the shear forces (low stirring forces), mixing tank defined by its hydraulic diameter D=0.5 m, flow guide with a height of 0.5 m, positioned at 0.25 m (0.5 D) from the bottom of the reactor, settling structure of a height chosen to be n×$h_n$=0.3 m with n=4 and h=0.075 m, positioned such that its bottom part is at a height of 0.7 m [>(0.25 D+H)] from the bottom point of the reactor, i.e. 1.4 D.

Furthermore, the following conditions were adopted:

| Reactor volume | 250 L |
| --- | --- |
| Ratio H(separation zone)/H(mixing-precipitation zone) | 0.6 |
| Throughput of water to treat | 1000 L/h |
| Solid precipitated/crystallized | CaCO3 - calcium carbonate |
| precipitation pH | 10.3 |
| Precipitation reagents | Ca(OH)2 - lime |
| Solid content in the reactor | 0-350 g/L |
| Solid content in overflow (above the settling zone) | 0.05-0.2 g/L |
| Effective retention percentage | 0->99.9% |
| Residence time of the liquid in the mixing/precipitation tank | 8 min |

The characteristics of the treated water were the following:
pH: 7.5-8.5
Ca2+: 48-52 ppm
Mg2+: 16-20 ppm
Alkalimetric titration: 280-320 eq ppm CaCO3
SO42−<60 ppm
Cl<10 ppm
Residual turbidity 0.5NTU Relative to a conventional method of physico-chemical decarbonation without settling zone and with re-circulation of sludge, the following variations were found:
full precipitation (approximately 390 ppm precipitated CaCO3/L),
division of the residence time by 3.8 (8 minutes),
multiplication of the degree of extraction of sludge by 5 to 6 (85% at 250-300 g/l, or higher),
multiplication of the D50 level by 3 to 4 (120-130 microns); it is to be recalled that D50 is the median diameter of the particle size distribution, that is to say that 50% of the particles, by mass, have a smaller diameter and 50%, by mass, have a larger diameter,
multiplication of the decantation speed (without coagulation/flocculation) by 4-8 (9 m/h),
division of the specific resistance (SR) to dehydration by 3 to 4 log (SR=1.56 $10^9$ m/kg)
particle retention rate: more than 85% by mass of the TSS are retained in the reactor without coagulation/flocculation),
requirement for post-treatment divided by 2 to 4 (40 ppm FeCl3 & 0.1 ppm AN934, polyanionic of polyacrylamide type commercialized by the company FLOERGER SNF)
division by 3 of the volume of "sludge" produced after a decantation test, which consists of taking off a liter of sludge, of placing it in a test tube of one liter, then of leaving it to decant for a period of 30 minutes, in the absence of light and vibrations.

Thus, it has been established that the configuration of the settling layer (overall dimensions, geometry and dimensions of the channels, distribution of the channels in the layer, etc.) has appeared to enable a very significant reduction in the turbulence intensity, giving better performance (for similar tank height):
compared with a device without any settling material
compared with an existing conventional decantation device constituted by parallel lamellae without change in direction (e.g. lamellar decanter lamellae).

The setting up of a settling structure according to the invention makes it possible to
dissociate the hydraulic residence time from the precipitated solid residence time so enabling an increase in the size of the particles produced and thus better decantation, dehydration.
Increase the content of solids in the precipitation reactor without sludge re-circulation.
Reduce (or eliminate) the suspended particle concentration or residual turbidity of the treated water or prior to tertiary treatment by coagulation flocculation, so limiting the quantity of reagents necessary for the treatment of said turbidity or by membrane filtration (organic or ceramic) eliminating the use of reagents and ensuring higher compactness or by any solid-liquid separation methods. It arises therefrom in particular that one advantage of the invention is to impact the effectiveness of post-treatments or so-called tertiary treatments (such as coagulation or flocculation) by reducing the doses of reagents necessary during those steps, or even to mean that those post-treatments are no longer necessary.
On the basis of a precipitation method, produce a precipitate presenting conjointly particle sizes (size) and purity (quality), difficult to attain with the methods of the prior art.

The specific configuration of the settling layer (or structure) to which said invention is directed makes it possible to group together steps of reaction, decantation and recirculation into a single compact step so giving an advantage relative to conventional separators (physical reduction in the size of the reactor).

Overall, by adapting said invention upstream of a lamellar decanter and by including it in a conventional method of physico-chemical decarbonation, the method is improved thanks to operation with a high loading in solids/sludge (15-30%) in the precipitation reactor. The increase in reaction performance combined with a new approach in the design of the method makes it possible to:
Reduce the energy footprint (elimination of re-circulation of sludge)
Reduce or avoid (hence the possibility of the lack of inlet for reagents into the tank) the consumption of reagent assisting in the turbidity treatment (coagulant flocculants); this corresponds to the aforementioned advantage of reducing the reagents that are useful in any post-treatment steps
Increase the compactness of the reactor (reduction in the residence time of the precipitation step, elimination of the re-circulation)
Lessen, reduce the post treatment of the solid produced (reduction in the volume of sludge, low specific resistance to dehydration, high decantation speed, improved product quality for added value) by the production of solid particles having a homogenous size distribution with a large size, a morphology facilitating their post-treatment without the use of complementary additives that are generally found in said collected solid sludges.

A reactor according to the invention may be integrated into various techniques:
Methods of precipitation+solid liquid separation by membranes (organic or ceramic): Said improvement both makes it possible to improve the performance of the precipitation reaction (precipitation of inorganic salts (CaCO3, gypsum, Mg(OH)2, calcium fluoride, calcium phosphate, . . . and metals, metal oxides and hydroxides) as cited previously (previous page), as well as to reduce the load entering a later treatment unit such as filtration membranes (reduction in clogging, increase in the life of the membranes (reduction in abrasion)),
It being possible for the aforementioned later pre-treatment unit to be any operation of solid-liquid separation.

The invention provides a saving from the point of view of production engineering, but also from the point of view of chemical engineering.

The invention claimed is:

1. A water treatment device comprising a mixing tank provided with an inlet path for an effluent to be treated, a source of stirring capable of inducing turbulent stirring in a given volume of the tank, an extraction path enabling the discharge of sludge, and a treated effluent extraction path, further comprising, above the inlet path for effluent to be treated and above and adjacent to the given volume, but below the outlet path for a treated effluent, a settling structure comprising a plurality of flow channels extending from a bottom of the settling structure to a top of the settling structure; the flow channels assuming a zig-zag configuration such that no particle can pass through the settling structure along a rectilinear path; wherein the flow channels include a plurality of rectilinear sections wherein a plurality of the rectilinear sections assume an acute non-zero inclination with respect to a horizontal plane; wherein the flow channels are contiguous and formed by parallel plates and a plurality of parallel strips and wherein the parallel plates and the parallel strips form polygonal cross-sections; wherein the settling structure comprises a plurality of at least two layers and wherein each layer constitutes a network of contiguous flow channels; and wherein a fluid stream moving from the top of the settling structure forms the treated effluent.

2. A device according to claim 1, wherein the channels have a helical configuration.

3. A device according to claim 1, wherein the channels have a uniform cross-section from a lower face of the structure to an upper face.

4. A device according to claim 1, wherein the channels have a cross-section which varies over at least part of the height of the settling structure.

5. A device according to claim 1, wherein the channels have an inclination comprised between 35° and 85° relative to the horizontal plane.

6. A device according to claim 1, wherein the two layers comprise sections inclined relative to the horizontal plane and are separated by a layer in which the sections are vertical.

7. A device according to claim 1, wherein the channels are formed by corrugated walls.

8. A device according to claim 1, wherein the channels are formed by planar walls.

9. A device according to claim 1, further comprising a flow-guide around the stirring source.

10. A device according to claim 1, wherein the settling structure is situated above the bottom of the tank between 0.25 and 3 times the hydraulic diameter of the tank.

11. A method of treatment by precipitation of an effluent containing dissolved pollution, wherein the effluent and precipitation reagents are injected into a tank in a given volume of which turbulent stirring is induced, the effluent, in which precipitation has been induced by the reagents, is made to flow from a bottom to a top through a settling structure situated above and adjacent to the given volume; and wherein the settling structure includes a plurality of flow channels extending from the bottom of the settling structure to the top of the settling structure; wherein the flow channels assume a zig-zag configuration such that no particle can pass through the settling structure along a rectilinear path; wherein the flow channels include a plurality of rectilinear sections and wherein a plurality of the rectilinear sections of the flow channel have a non-zero inclination with respect to a horizontal plane; wherein the flow channels are contiguous and are formed by a plurality of parallel plates and a plurality of parallel strips and wherein the plurality of plates and the plurality of strips form polygonal cross-sections; wherein the settling structure comprises a plurality of at least two layers and wherein each layer constitutes a network of contiguous flow channels; and wherein liquid streams leaving the settling structure form a treated effluent which is extracted at a level situated above the settling structure whereas a sludge is extracted at a lower part of said given volume.

12. The water treatment device of claim 1 wherein said settling structure includes a plurality of vertically spaced zones with each zone being defined, in part at least, by a series of the parallel plates that are angled relative to a vertical reference line; the plates of one zone being disposed at an angle relative to the plates of an adjacent zone; and a plurality of the strips extends generally vertically between the plates of each zone to form the plurality of the flow channels.

13. The water treatment method of claim 11 wherein the strips are disposed in parallel relationship to each other such that the strips and parallel plates form the flow channels which are of a uniform cross-section.

14. The water treatment method of claim 11 wherein there are provided at least three zones of parallel plates and generally vertical strips.

15. A reactor for treating water comprising:
   a tank having an inlet associated with the tank for directing water to be treated into the tank, the inlet positioned intermediately on the tank between a top and bottom of the tank;
   an outlet associated with the tank for directing treated water from the tank, the outlet positioned on the tank at a height above the inlet;
   a mixer disposed in the tank for mixing the water with one or more reagents;
   a settling structure disposed in the tank and located at a height in the tank generally between the inlet and outlet and wherein the settling structure is disposed over the mixer, the settling structure comprising:
   i. plurality of flow channels that form a layer;
   ii. wherein the flow channels extend generally upwardly from a bottom of the settling structure;
   iii. wherein the flow channels are formed by a plurality of plates and strips which form a contiguous group of flow channels that have polygonal cross-sections;
   iv. wherein respective flow channels include a series of connected rectilinear sections with a plurality of rectilinear sections of each flow channel assuming a different angular orientation relative to a horizontal plane such that the flow channels assume a zig-zag configuration from the bottom of the settling structure to the top of a settling structure such that no particle can pass through the settling structure in a rectilinear path; and
   v. wherein treated water exits the top of the settling structure and is discharged through the outlet.

16. The reactor of claim 15 including at least two layers of flow channels disposed in the tank and wherein each layer includes a series of contiguous flow channels.

17. The reactor of claim 15 wherein the rectilinear sections of the flow channels form a plurality of zones and wherein the flow channels of each zone are disposed in parallel relationship but wherein the flow channels of each zone are disposed at different angles relative to the horizontal plane.

18. The reactor of claim 15 wherein respective flow channels include a rectangular or square cross-section.

19. The reactor of claim 15 wherein the respective flow channels have cross-sections having transverse dimensions which are the same order of magnitude in any transverse direction.

20. The reactor of claim 19 wherein there are two layers of flow channels disposed in the tank and wherein the orientation of the rectilinear sections of the flow channels of one layer are substantially different from the orientation of the rectilinear sections of the other layer.

* * * * *